United States Patent
Saraswathi et al.

(10) Patent No.: US 10,704,464 B2
(45) Date of Patent: Jul. 7, 2020

(54) ACOUSTIC NOZZLES FOR INLET BLEED HEAT SYSTEMS

(71) Applicant: General Electric Company, Schenectady, NY (US)

(72) Inventors: Rajesh Prabhakaran Saraswathi, Karnataka (IN); Senthilkumar Jeyaraj, Karnataka (IN); Arun Eapen Mathew, Karnataka (IN)

(73) Assignee: General Electric Company, Schenectady, NY (US)

( * ) Notice: Subject to any disclaimer, the term of this patent is extended or adjusted under 35 U.S.C. 154(b) by 789 days.

(21) Appl. No.: 15/044,149

(22) Filed: Feb. 16, 2016

(65) Prior Publication Data

US 2017/0234239 A1     Aug. 17, 2017

(51) Int. Cl.
  *F02C 7/045* (2006.01)
  *F02C 7/047* (2006.01)
  *F02C 6/08* (2006.01)
  *F01N 1/10* (2006.01)

(52) U.S. Cl.
  CPC ........... *F02C 7/047* (2013.01); *F02C 6/08* (2013.01); *F02C 7/045* (2013.01); *F01N 1/10* (2013.01); *F05D 2260/96* (2013.01)

(58) Field of Classification Search
  CPC .......... F02C 7/045; F02C 7/047; F02C 7/078; F01N 1/082; F01N 1/084; F01N 1/085; F01N 1/10; F01N 1/24; F02M 35/1211; F02M 35/1233; F02M 35/1272; B05B 1/00; B05B 1/002
  See application file for complete search history.

(56) References Cited

U.S. PATENT DOCUMENTS

| | | | | |
|---|---|---|---|---|
| 722,567 | A * | 3/1903 | Crawford | F01N 1/10 181/256 |
| 1,575,657 | A * | 3/1926 | Straussler | F01N 1/082 181/258 |
| 3,561,561 | A * | 2/1971 | Trainor | F01N 1/08 181/267 |
| 4,580,657 | A * | 4/1986 | Schmeichel | F01N 1/08 181/252 |
| 5,166,479 | A | 11/1992 | Gras et al. | |
| 7,185,678 | B1 * | 3/2007 | Stell | F01N 1/082 138/41 |
| 7,416,050 | B2 * | 8/2008 | Friou | F02C 7/045 181/232 |
| 8,272,222 | B2 | 9/2012 | Zhang et al. | |

(Continued)

FOREIGN PATENT DOCUMENTS

| | | |
|---|---|---|
| EP | 1 461 513 B1 | 8/2006 |
| WO | 03/056147 A2 | 7/2013 |

*Primary Examiner* — Gerald L Sung
*Assistant Examiner* — Rene D Ford
(74) *Attorney, Agent, or Firm* — Eversheds Sutherland (US) LLP

(57) ABSTRACT

The present application provides an acoustic nozzle for an inlet bleed heat system using a flow of compressor discharge air. The acoustic nozzle may include an outer casing, an acoustic attenuation medium within the outer casing, a number of exit apertures positioned in the outer casing, an air pipe in communication with the outer casing, and a reduced flow area positioned about the outer chamber and the air pipe for the flow of compressor discharge air.

9 Claims, 2 Drawing Sheets

(56) References Cited

U.S. PATENT DOCUMENTS

| | | |
|---|---|---|
| 8,844,258 B2 | 9/2014 | Ekanayake et al. |
| 2004/0256174 A1 | 12/2004 | Friou |
| 2012/0324843 A1 | 12/2012 | Saraswathi et al. |
| 2013/0087219 A1 | 4/2013 | Rajesh et al. |
| 2014/0099876 A1 | 4/2014 | Saraswathi et al. |
| 2014/0123674 A1 | 5/2014 | Hao et al. |
| 2014/0321967 A1 | 10/2014 | Zhang et al. |
| 2015/0059312 A1 | 3/2015 | Rajesh et al. |
| 2015/0068217 A1 | 3/2015 | Merchant et al. |

* cited by examiner

US 10,704,464 B2

ACOUSTIC NOZZLES FOR INLET BLEED HEAT SYSTEMS

TECHNICAL FIELD

The present application and the resultant patent relate generally to gas turbine engines and more particularly relate to improved acoustic nozzle designs for inlet bleed heat systems.

BACKGROUND OF THE INVENTION

The operational efficiency and the overall power output of a gas turbine engine generally increases as the temperature of the hot combustion gas stream increases. High combustion gas stream temperatures, however, may produce higher levels of nitrogen oxides (NOx). Such emissions may be subject to both federal and state regulations in the U.S. and also may be subject to similar regulations abroad. A balancing act thus exists between the benefits of operating the gas turbine engine in an efficient high temperature range while also ensuring that the output of nitrogen oxides and other types of regulated emissions remain well below mandated levels. Moreover, varying load levels, varying ambient conditions, and other types of operational parameters also may have a significant impact on overall gas turbine output, efficiency, and emissions.

Several types of known gas turbine engine designs, such as those using Dry Low NOx ("DLN") combustors, generally premix the flow of fuel and the flow of air upstream of a reaction or a combustion zone so as to reduce NOx emissions via a number of premixing fuel nozzles. Such premixing tends to reduce peak flame temperatures and, hence, NOx emissions.

Gas turbine engine compressors often include air inlet systems with heating devices for raising the temperature of the incoming airstream. Compressor inlet guide vane icing, surge/stall margin, combustion lean blowout, and the like may result due to cold ambient conditions and/or due to other types of operational parameters. As such, the compressor pressure ratio may be accommodated by bleeding an amount of compressor discharge air and recirculating the air back to the compressor inlet for mixing the cooler ambient air with the bleed portion of the hot compressor discharge air. Such mixing reduces the air density and the mass flow to the gas turbine. Inlet bleed heat also may extend the range of operation of a Dry Low NOx combustion system in an efficient premix mode by keeping the fuel/air ratio as constant as possible.

SUMMARY OF THE INVENTION

The present application and the resultant patent provide an acoustic nozzle for an inlet bleed heat system using a flow of compressor discharge air. The acoustic nozzle may include an outer casing, an acoustic attenuation medium within the outer casing, a number of exit apertures positioned in the outer casing, an air pipe in communication with the outer casing, and a reduced flow area positioned about the outer chamber and the air pipe for the flow of compressor discharge air.

The present application and the resultant patent further may provide a method of discharging compressor discharge air in an inlet bled heat system. The method may include the steps of flowing the compressor discharge air to an acoustic nozzle in the inlet bled heat system, flowing the compressor discharge air through a reduced flow area in the acoustic nozzle, flowing the compressor discharge air through an acoustic attenuation medium in the acoustic nozzle, and flowing the compressor discharge air through a number of exit apertures in the acoustic nozzle.

The present application and the resultant patent further may provide an acoustic nozzle for an inlet bleed heat system using a flow of compressor discharge air. The acoustic nozzle may include an outer casing extending from an upstream end to downstream end, an acoustic attenuation medium within the outer casing, a number of exit apertures positioned in the outer casing, an air pipe in communication with the outer casing, and a reduced flow area positioned about the outer chamber and the air pipe to reduce the energy of the flow of compressor discharge air.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
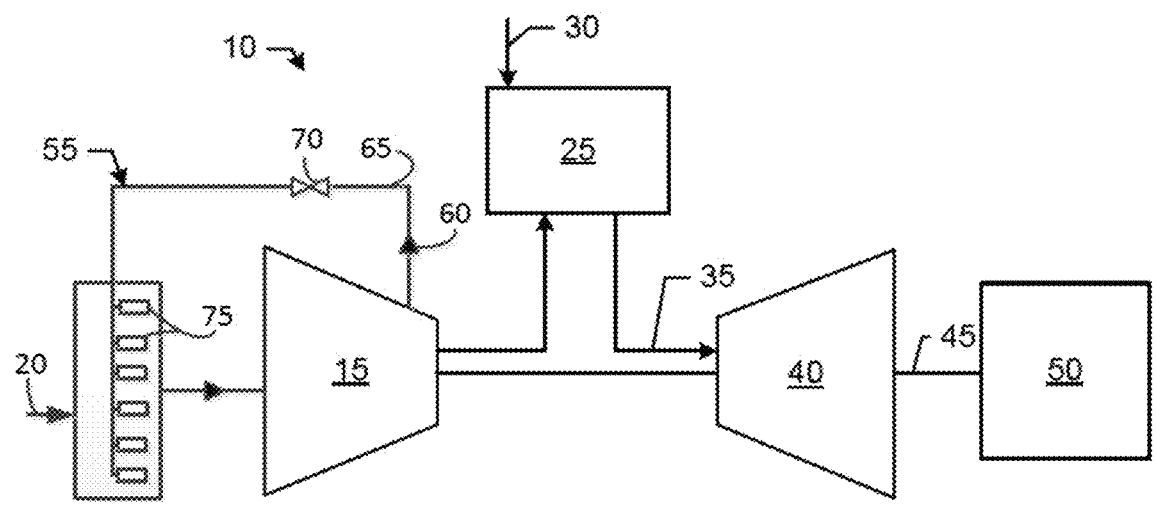
FIG. 1 is a schematic diagram of a gas turbine engine with an inlet bleed heat system.

Referring now to the drawings, in which like numerals refer to like elements throughout the several views, FIG. 1 shows a schematic view of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of the combustors 25 arranged in a circumferential array or otherwise. The flow of combustion gases 35 is delivered in turn to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

The gas turbine engine 10 also may include an inlet bleed heat system 55. The inlet bleed heat system 55 may be positioned upstream of the inlet of the compressor 15. The inlet bleed heat system 55 may divert a heated flow of compressor discharge air 60 to the inlet of the compressor 15. The inlet bleed heat system 55 may include a compressor discharge line 65 with one or more control valves 70 thereon. The inlet bleed heat system 55 may discharge the compressor discharge air 60 via a number of acoustic nozzles 75. The acoustic nozzles 75 may serve to reduce the velocity of the compressor discharge air 60 by mixing the compressor discharge air with outside ambient air. The acoustic nozzles 75 also serve to reduce the overall noise created by the compressor 15 and the overall gas turbine engine 10.

Figure 2:
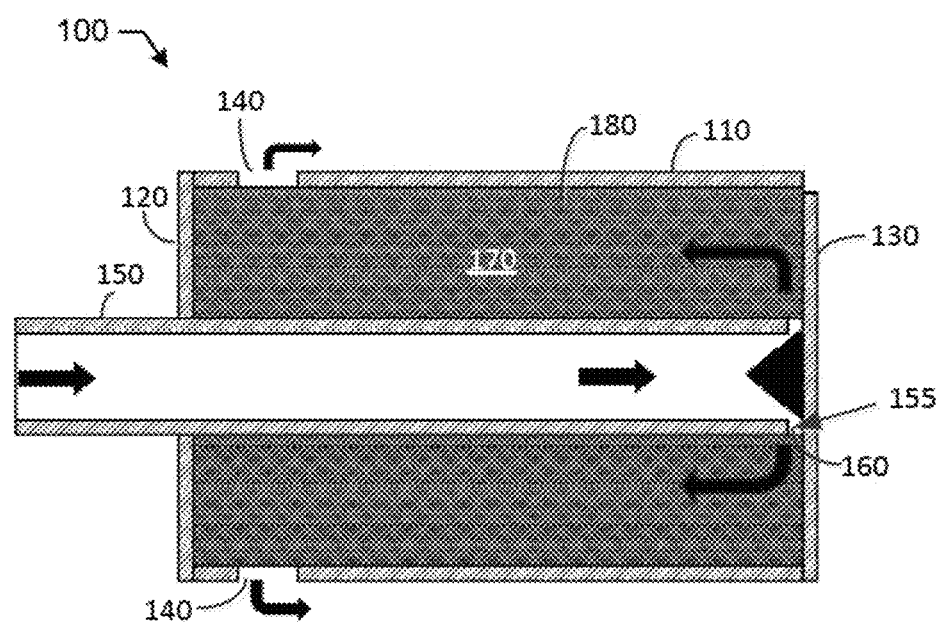
FIG. 2 is a schematic diagram of an acoustic nozzle as may be described herein for use with the inlet bleed heat system of FIG. 1.

FIG. 2 shows an example of an acoustic nozzle 100 as may be described herein. The acoustic nozzle 100 may include an outer casing 110. The outer casing 110 may have any suitable size, shape, or configuration. The outer casing 110 may extend from a first end 120 to a second end 130. The first or the upstream end 120 may have a number of exit apertures 140 extending through the outer casing 110. Any number of the exit apertures 140 may be used herein in any suitable size, shape, or configuration. The second or the downstream end 130 may be enclosed. The acoustic nozzle 100 also may include an air pipe 150. The air pipe 150 may extend from the compressor discharge line 65 in communication with the compressor discharge air 60 and into the outer casing 110. The air pipe 150 may have a reduced flow area 155 in or at the end thereof about the second end 130 of the outer casing 110. In this example, the reduced flow area may take the form of one or more slots and/or gaps 160 in the air pipe 150 or between the air pipe and the second end 130 of the outer casing 110. The slots or the gaps 160 may have any suitable size, shape, or configuration. The slots or the gaps 160 may be smaller than the exit apertures 140. An annulus area 170 between the air pipe 150 and the outer casing 110 may be filled with an acoustic attenuation medium 180. The acoustic attenuation medium 180 may be a wire mesh, a mineral wool, or other type of porous material. Other components and other configurations may be used herein.

In use, the size of the slots or the gaps 160 in or between the air pipe 140 and the second end of the 130 of the outer casing 110 may be calculated based on the overall sonic conditions. Once the compressor discharge air 60 leaves the slots or the gaps 160 of the air pipe 150, the acoustic attenuation medium 180 serves to breakdown the shockwaves therein so as to make the flow substantially uniform. The presence of an acoustic media prevents noise from traveling back in the upstream direction. The hot compressor discharge air 60 then flows through the acoustic attenuation medium 180 to the first end 120 of the outer casing 110 and exits to the ambient via the larger exit apertures 140. The upstream exit apertures 140 provide a longer travel path for the hot compressor discharge air 60 before and after mixing with ambient air.

Figure 3:
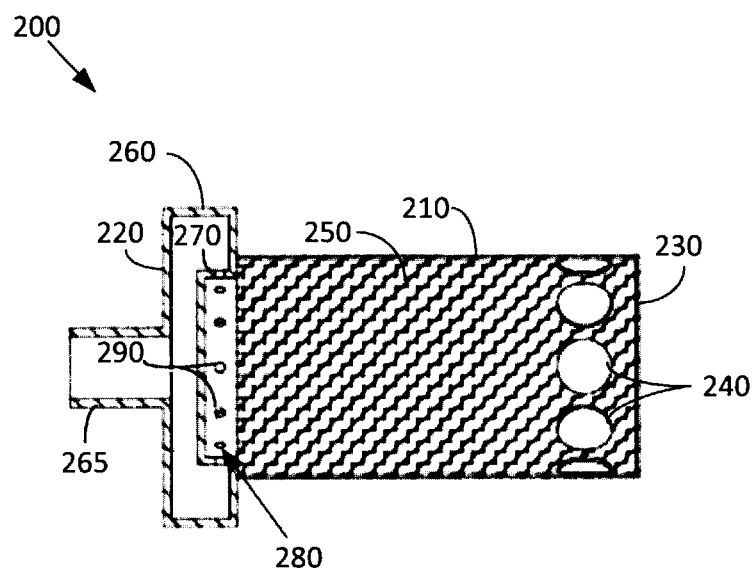
FIG. 3 is a schematic diagram of an alternative embodiment of an acoustic nozzle that may be used herein.

FIG. 3 shows a further embodiment of an acoustic nozzle 200 as may be described herein. The acoustic nozzle 200 may include an outer casing 210. The outer casing 210 may have any suitable size, shape, or configuration. The outer casing 210 may extend from a first or an upstream end 220 to a second or a downstream end 230. In this example, the second or the downstream end 230 may include a number of exit apertures 240. The exit apertures 240 may have any suitable size, shape, or configuration. The outer casing 210 may be filled with an acoustic attenuation medium 250. The acoustic attenuation medium 250 may be a wire mesh, a mineral wool, or other type of porous material. The first or the upstream end 220 of the outer casing 210 may include an air chamber 260 in communication therewith. The air chamber 260 may be in communication with the compressor discharge line 65 and the compressor discharge air 60 via an air pipe 265. The air chamber 260 may have any suitable size, shape, or configuration. The air chamber 260 may include a sonic air annulus 270 with a reduced flow area 280 positioned about the outer casing 210. In this example, the reduced flow area 280 may take the form of a number of sonic annulus holes 290. Any number of the sonic air annulus holes 290 may be used herein in any suitable size, shape, or configuration. Other components and other configurations may be used herein.

In use, the hot compressor discharge air 60 flows into the air chamber 260 and through the sonic annulus holes 290 of the sonic air annulus 270. The compressor discharge air 60 then flows though the acoustic attenuation medium 250 within the outer casing 210 and exits to the ambient via the exit apertures 240 at the downstream or the second end 230 thereof. The acoustic attenuation medium 250 stabilizes the flow so as to make it substantially circumferentially uniform throughout the sonic air annulus holes 290 and thereby provides a more uniform flow about the nozzle 200. Other components and other configurations may be used herein.

Figure 4:
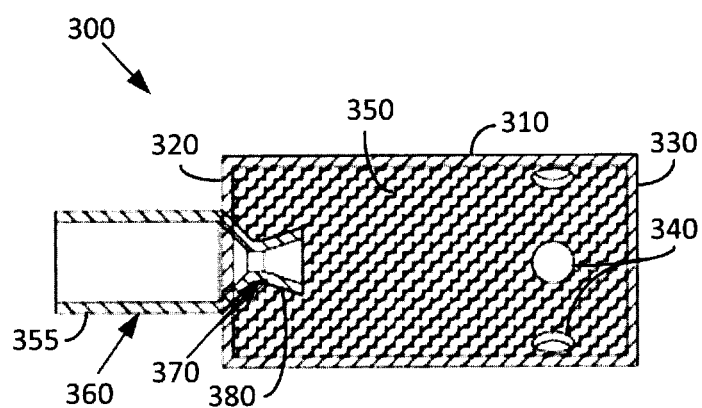
FIG. 4 is a schematic diagram of an alternative embodiment of an acoustic nozzle that may be used herein.

FIG. 4 shows an example of a further embodiment of an acoustic nozzle 300 as may be described herein. The acoustic nozzle 300 may include an outer casing 310. The outer casing 310 may have any suitable size, shape, or configuration. The outer casing 310 may extend from a first or an upstream end 320 to a second or a downstream end 330. The second or the downstream end 330 may have a number of exit apertures 340 positioned therein. Any number of the exit apertures 340 may be used herein in any suitable size, shape, or configuration. The outer casing 310 may be filled with an acoustic attenuation medium 350. The acoustic attenuation medium 350 may be a wire mesh, a mineral wool, or other type of porous material. The acoustic nozzle 300 may include an air pipe 355 in the form of a venturi pipe 360. The venturi pipe 360 may be in communication with the compressor discharge line 65 with the compressor discharge air 60. The venturi pipe 360 may have a reduced flow area 370 positioned about the first or upstream end 320 of the outer casing 310. In this example, the reduced flow area 270 may be in the form of a reduced flow throat 380. The reduced flow throat 380 provides a venturi effect on the flow of the compressor discharge air 60 entering the outer casing 310. The reduced flow throat 380 may have any suitable size, shape, or configuration. Other components and other configurations may be used herein.

In use, the hot compressor discharge air 60 flows through the venturi pipe 360 with the reduced flow throat 380. The reduced flow throat 380 produces a choke flow condition where the fluid velocity approaches the local speed of sound. In such a choke flow, the mass flow rate may not increase with a further decrease in the downstream pressure. The mass flow rate for a compressible fluid, however, may increase with increased upstream pressure so as to increase the density of the fluid through the throat 370 (although the velocity will remain constant). The flow then leaves the throat 380, passes through the acoustic attenuation medium 350, and exits via the exit apertures 340.

The acoustic nozzles 100, 200, 300 described herein thus expand the pressure of the compressor discharge air 60 to the atmosphere by reducing the energy and the velocity of the flow through the use of the reduced flow areas such as the slots 160, the air annulus holes 290, and/or the reduced flow throat 380. Likewise, the use of the acoustic attenuation medium reduces the overall noise. Moreover, the acoustic nozzles 100, 200, 300 may provide an overall simplified design. The acoustic nozzles 100, 200, 300 may be original equipment and/or part of a retro-fit. Different types of the acoustic nozzles 100, 200, 300 may be used together.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An acoustic nozzle for an inlet bleed heat system using a flow of compressor discharge air, comprising;
    an outer casing comprising an outer annular casino wall with a longitudinal axis;
    an acoustic attenuation medium within the outer casing;
    a plurality of exit apertures positioned in the outer casing;
    an air pipe in communication with the outer casing;
    an air chamber positioned between the outer casing and the air pipe along the longitudinal axis;
    the air chamber comprising an air annulus positioned adjacent to the outer casing;
    the air annulus formed between an outer diameter annular air chamber wall and an inner diameter annular air chamber wall;
    a reduced flow area positioned about the air chamber and in communication with the air pipe for conveying the flow of compressor discharge air;
    wherein the reduced flow area comprises a plurality of air annulus holes through the inner diameter annular air chamber wall.

2. The acoustic nozzle of claim 1, wherein the outer casing comprises a first end and a second end.

3. The acoustic nozzle of claim 2, wherein the plurality of exit apertures are positioned about the first end of the outer casing.

4. The acoustic nozzle of claim 2, wherein the plurality of exit apertures are positioned about the second end of the outer casing.

5. The acoustic nozzle of claim 2, wherein the plurality of exit apertures is positioned about the first end of the outer casing and the reduced flow area is positioned about the second end of the outer casing.

6. The acoustic nozzle of claim 2, wherein the plurality of exit apertures is positioned about the second end of the outer casing and the reduced flow area is positioned about the first end of the outer casing.

7. The acoustic nozzle of claim 1, wherein the acoustic attenuation medium comprises a wire mesh or a mineral wool.

8. The acoustic nozzle of claim 1, wherein the plurality of exit apertures is larger in size than the reduced flow area.

9. An acoustic nozzle for an inlet bleed heat system using a flow of compressor discharge air, comprising:
    an outer casing comprising an outer annular casing wall with a longitudinal axis and extending from an upstream end to a downstream end;
    an acoustic attenuation medium within the outer casing;
    a plurality of exit apertures positioned on the outer casing;
    an air pipe in communication with the outer casing;
    an air chamber positioned between the outer casing and the air pipe along the longitudinal axis;
    the air chamber comprising an air annulus positioned adjacent to the outer casing;
    the air annulus formed between an outer diameter annular air chamber wall and an inner diameter annular air chamber wall; and
    a reduced flow area positioned about the air chamber and in communication with the air pipe to reduce the energy of the flow of compressor discharge air;
    wherein the reduced flow area comprises a plurality of air annulus holes through the inner diameter annular air chamber wall.

* * * * *